United States Patent [19]

Ohe

[11] Patent Number: 4,775,222

[45] Date of Patent: * Oct. 4, 1988

[54] LIGHT DIFFUSING DEVICE

[75] Inventor: Makoto Ohe, Tokyo, Japan

[73] Assignee: Mitsubishi Rayon Company Ltd., Tokyo, Japan

[*] Notice: The portion of the term of this patent subsequent to Mar. 10, 2004 has been disclaimed.

[21] Appl. No.: 934,564

[22] Filed: Nov. 25, 1986

Related U.S. Application Data

[62] Division of Ser. No. 729,361, May 1, 1985, Pat. No. 4,648,690.

[51] Int. Cl.[4] .................... G02B 26/02; G02B 17/00
[52] U.S. Cl. .................................. 350/321; 350/320; 362/26
[58] Field of Search .................. 350/321, 3.81, 345, 350/320; 362/26, 31

[56] References Cited

U.S. PATENT DOCUMENTS 2,831,453 4/1958 Hardesty ............................... 362/26
3,491,245 1/1970 Hardesty ............................... 362/26
4,059,916 11/1977 Tachihara et al. .................. 362/31
4,648,690 3/1987 Ohe ..................................... 350/321

Primary Examiner—John K. Corbin
Assistant Examiner—Loha Ben
Attorney, Agent, or Firm—Oblon, Fisher, Spivak, McClelland & Maier

[57] ABSTRACT

A light diffusing device is disclosed for an edge lighted panel wherein the device includes a thin transparent light transmitting base plate, a light diffusing layer formed on a front surface of the base plate and a light reflection surface formed in the vicinity of the rear surface of the base plate. The base plate and the light diffusing layer are integrally bonded together through an intermediate layer formed between the base plate and the light diffusing layer.

4 Claims, 2 Drawing Sheets

LIGHT DIFFUSING DEVICE

This is a division, of application Ser. No. 729,361, filed May 1, 1985, now U.S Pat. No. 4,648,690.

BACKGROUND OF THE INVENTION

1. Field of the Invention

This invention is related to a light diffusing device particularly used for an edge lighted panel. This type of light diffusing device receives light from a source and provides a plane of light to be used for uniform illumination of a relatively large area. It is practically employed as an illumination for display devices such as advertising lamps, and further, as rear face illumination means for liquid crystal display devices.

2. Discussion of Background

Light diffusing plates such as frosted glass plates or opaque white glass plates have been widely employed as light diffusing devices. They are usually utilized with a light source disposed by a predetermined distance on the rear side of the light diffusing plate.

Because miniaturization of the light diffusing device is particularly in demand with respect to liquid crystal display devices and the like, the miniaturization of the illumination means is accordingly also desirable. In view of the requirements for miniaturization, the disposal of a light source in the vicinity of the edge face of the diffusing plate has been often used, with this particular edge face being utilized as a light incident face. However, uniform brightness over the entire surface of the diffusing plates cannot be obtained by merely disposing the optical source at the edge face of the frosted glass or opaque white glass plate.

In view of the above lack of uniform brightness, by the mere placement of the diffusing plate, it has been proposed, for instance, in U.S. Pat. No. 4,059,916 that matting fabrication be applied to the rear face in a hairline manner from the edge face on the side of the light source to an end face opposing that edge face. This provides for directionality for the optical transmission within the diffusing plate and further provides that the thickness of the diffusing plate is gradually decreased toward the opposing end face to thereby improve the brightness of the diffusing plate at the opposing end face in order to obtain a uniform brightness over the entire surface.

It is to be noted that one of the disadvantages of this type of structure shown in U.S. Pat. No. 4,059,916, is that it requires a very fine and delicate fabrication to the surface of the transparent substrate which of course provides problems with respect to the production and cost. Thus, this particular solution is unsatisfactory in the light of the present demand for cost reduction of the device.

A further attempt to solve the above problems concerns the use of ligtt diffusing plates in which a light permeable light diffusing layer is formed over the entire surface of a transparent base plate with the exception of a light incident edge face of the base plate. A light diffusing layer is further formed over the entire light diffusing layer on the surface of the transparent base plate except for the face on which light is irradiated. This is disclosed in Japanese Utility Model Application No. 117321/1983.

Another attempt at solving the problems in this area is indicated in Japanese Utility Model Application No. 117322/1983 which provides a reflection layer formed on the rear face of a transparent base plate and a light permeable light diffusing layer formed over the entire surface of the transparent base plate with the exception of the rear face and a light incident face. Furthermore, a light screening layer is formed over the entire light diffusing layer on the surface of the transparent base plate with the exception of the face from which light is irradiated.

Although these attempts have provided a considerable improvement with respect to some of the above discussed disadvantages, it has been found that a portion of the incident light is reflected once again at the light diffusing face and absorbed by the light screening layer to produce optical losses.

SUMMARY OF THE INVENTION

Accordingly, one object of this invention is to provide a novel and improved light diffusing device which is particularly suitable to a relatively small-sized device which can provide for uniform brightness over the entire surface.

Another object of this invention is to provide a novel light diffusing device which can be manufactured easily.

Another object of this invention is to provide an improved light diffusing device that can provide a significant reduction in optical losses.

The light diffusing device of the present invention which provides the above advantages includes a thin transparent light transmitting base plate having at least one edge face of the base plate serving as a light incident face. A light diffusing layer is formed on a front surface of the base plate and a light reflecting surface is formed on, or arranged in, the vicinity of a rear surface of the base plate. The improvement which characterizes the devices is that the base plate and the light diffusing layer are integrally bonded together through an intermediate layer formed on the base plate and the light diffusing layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
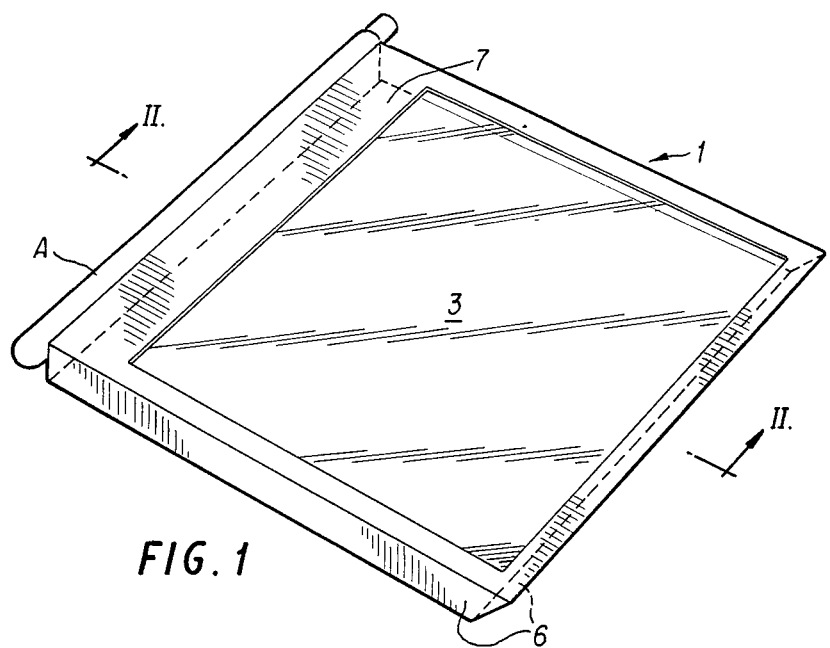
FIG. 1 is a perspective view of a light diffusing device according to the present invention.
Figure 2:
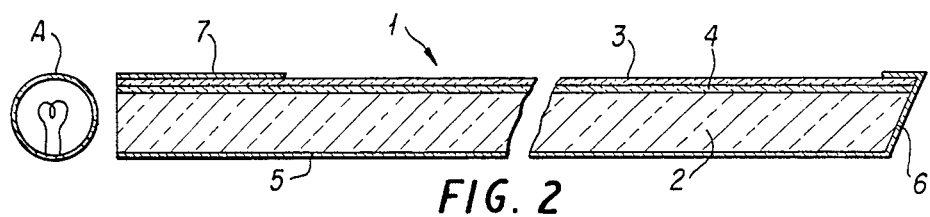
FIG. 2 is a cross-sectional view taken along line II—II in FIG. 1.

Referring now to the drawings, wherein like reference numerals designate identical or corresponding parts throughout the several views, and more particularly to FIGS. 1–2 thereof, there is shown a light diffusing device 1 composed of a thin transparent light transmitting base plate 2, a light diffusing layer 3 formed on a front surface of the base plate (upper face in FIG. 2)

and an intermediate layer 4 located between the diffusing layer 3 and the transparent light transmitting base plate 2. The base plate 2 is disposed at the rear surface (lower surface in FIG. 2) with a reflection surface 5, and a light source A is disposed along one edge face of the base plate 2. The edge faces of the base plate 2, with the exception of the edge face facing the light source A, are preferably formed as slanted or inclined faces. Each inclined face makes an acute, angle to the front (top) surface of the base plate and preferably provides an irregular light reflection layer so that the light is irregularly reflected on the edge-faces. The irreqular light reflection layer is indicated by the number 6 in FIG. 2. A light screening layer 7, described in more detail subsequently, is preferably formed on the light diffusing layer except for the portion from which light is irradiated as indicated in FIG. 2. A methyl methacrylate polymer sheet having a thickness between 0.3 and 20 mm with a preferable range being 3.0 to 15 mm may be used as the transparent light transmitting base plate 2.

A film constructed from a polymer product prepared by multi-stage polymerizations of an alkyl methacrylate as a main component is used as the light diffusing layer or film 3. Such polymer products have been disclosed in U.S. Pat. Nos. 3,804,925, 4,052,525 and 4,173,600 as well as U.S. application Ser. No. 526,546 filed on Aug. 26, 1983 (now U.S. Pat. No. 4,508,875). The light diffusing layer 3 has a thickness of preferably between 0.05 and 1 mm. The light diffusing layer contains a conventional light diffusing agent such as titanium oxide.

The front surface of the methyl methacrylate polymer base plate 2 is coated with a methacrylic monomeric material, for example, an acrylic adhesive or binder containing a light diffusing agent which partially dissolves in order to swell the front surface of the base plate 2. Then, the methacrylic monomeric material is polymerized.

Alternately, a methyl methacrylic monomer or partial polymer thereof is poured onto a surface of the methacrylic light diffusing layer, which partially dissolves in order to swell the surface of the light diffusing layer, and then the methyl methacrylate or syrup is subjected to polymerization, preferably under heat and pressure to form a base plate.

Other methods for combining the base plate with the light diffusing layer have been disclosed in U.S. Pat. No. 4,415,509.

By utilizing such methods, the surface of the light diffusing acrylic film or the methacrylate polymer base plate is partially dissolved in order to cause swelling by which the dissolved swollen layer forms intermediate layer 4 between the light diffusing layer 3 and the transparent base plate 2.

The intermediate layer 4 has a thickness of, for example, between 0.05 and 0.1 mm. By forming the light diffusing layer 3 and the intermediate layer 4 on a front surface of the base plate, the light transmitted in the base plate 2 can be diffused and irradiated satisfactorily to the outside of the base plate.

While the base plate 2 usually has a flat plate-like shape and the flat shape is usually of a rectangular configuration as shown in the drawing, the configuration is not necessarily restricted thereto, but may take other shapes. Further, although the thickness is usually made uniform over the entire surface, this is not essential. Any appropriate variation is possible. For example, the thickness can be gradually decreased from the end adjacent the light source toward the opposing end. Further, the area and the thickness of the base plate 2 can be varied depending on the purpose for which it is to be used.

The light reflection surface 5 may be formed, for instance, by vapor depositing or plating metal such as aluminum onto the base plate 2. Further, the light reflection surface 5 may also be formed by applying a metal-deposited tape (i.e., metal coated by gettering) having a light reflecting property onto the base plate 2. The thickness of the light reflection metal has no particular restriction so long as it performs sufficiently well as a light reflector.

An appropriate conventional random reflecting face with a suitable reflection factor may be used as the light scattering and reflection layer 6.

The light screening layer 7 is formed over the entire surface on the diffusing layer 3 of the base plate 2 except for the portion from which the light is irradiated toward the outside. The layer 7 may be formed of a coating with a highly effective light screening ability, for example, black paint. The thickness of the light screening coating layer 7 may be such that it is capable of providing a sufficient degree of light screening.

Figure 3A:
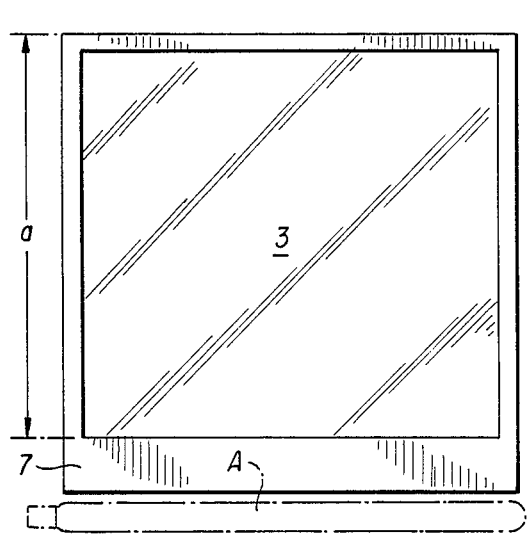
FIGS. 3(a) and 3(b) are respectively plane and side elevational views of the substrate.
Figure 3B:
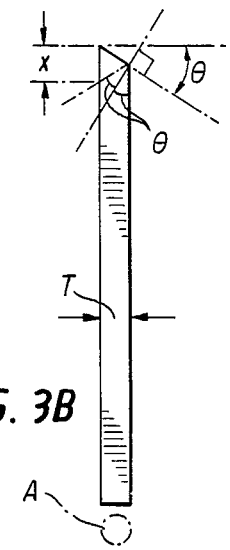

The angle of inclination of the slanted face at the edge face of the base plate 2 may preferably be determined as follows, referring particularly to FIGS. 3(a) and (b), which are respectively a schematic plan and a schematic side elevational view of the light diffusing device of the foregoing embodiment. In these figures, a represents the distance from the side of the device opposite the light source to the incident side on the light irradiating face over the surface of the base plate 2 (formed by the above referred to portion from which light is irradiated toward the outside), T represents the thickness of the base plate 2, $\theta$ is an angle of inclination at the edge face preferably $0° \leq \theta \leq 45°$) and X represents a distance along the surface of the base plate from a point at which a straight line extended, with an angle $2\theta$ relative to the rear face, from the rear face of the base plate 2 opposite the light source, intersects the front surface of the base plate 2, to the edge furthest from the light source A as shown in FIG. 3(b). In this case, the equation $$X = T(1+\tan^2\theta)/2\tan\theta$$

is established and it is desired to determine $\theta$ such that $0 \leq X \leq (\frac{1}{2})a$.

In such an arrangement, the scattered, reflected light from the inclined edge face can effectively be introduced to the diffusing layer 3 at a position remote from the light source A, in such a manner that the uniformity of the brightness on the light irradiating face is improved.

Figure 4:
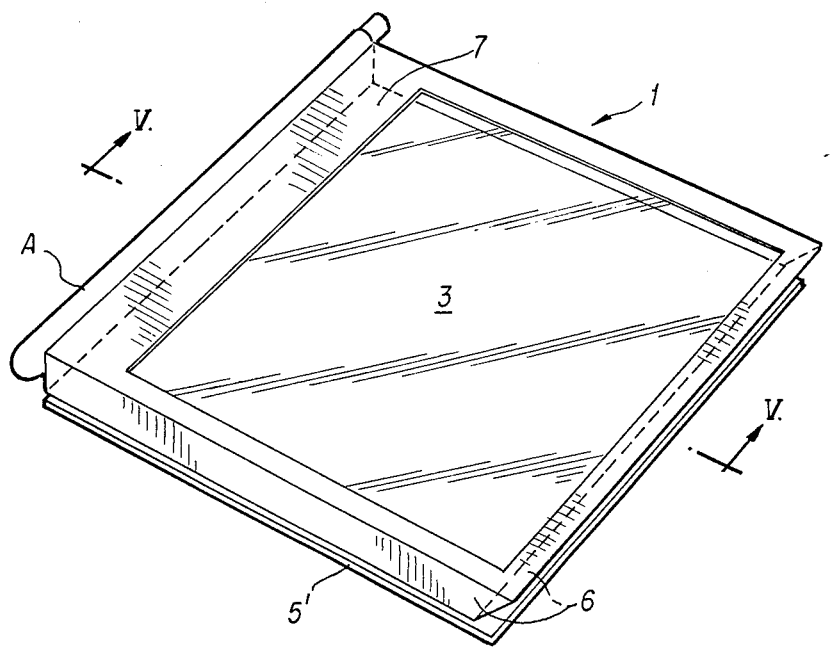
FIG. 4 is a perspective view of a light diffusing device according to a second embodiment of the present invention; and, FIG. 5 is a cross-sectional view taken along line V—V in FIG. 4.
Figure 5:
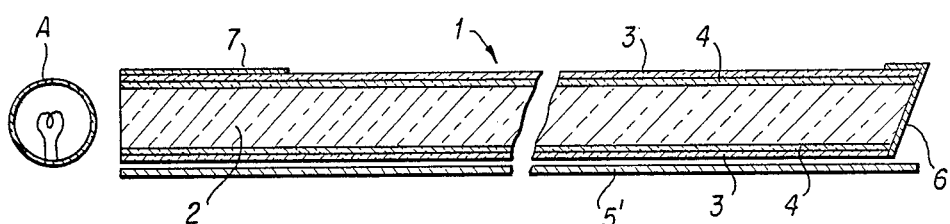

FIG. 4 is a perspective view of another embodiment of the light diffusing device according to this invention and FIG. 5 is a cross-sectional view taken along V—V of FIG. 4. The embodiment is different from the embodiment shown in FIG. 1 and FIG. 2 in that a light diffusing layer 3 and intermediate layer 4 are also formed on the rear surface in the same manner as on the front surface of the base plate 2, and a light reflection plate 5' is disposed in the vicinity of the rear surface of the base plate in place of the reflection surface 5 formed directly on the rear surface.

In this embodiment, since the light diffusing layer 3 and the intermediate layer 4 are formed on both the front and rear surfaces of the base plate, the light from the source A diffused by the diffusing layer 3 on the rear surface and reflected by the plate 5' undergoes an increased number of diffusions to further improve the uniformity of the light irradiated through the diffusing layer over the front surface.

This invention will be more fully described by way of preferred embodiments or specific examples, but it should be noted that these are mere examples of practicing this invention and the invention is no way limited only thereto.

EXAMPLE 1

A rutile type titanium oxide was added by (1) 0.8%, (2) 0.3% (3) 0.1% and (4) 0.005% respectively to an acrylic adhesive comprising methyl methacrylate containing about 10 weight percent of polymerized methyl methacrylate ("Acrybond", registered trade mark, manufactured by Mitsubishi Rayon Co.) and sufficiently mixed so as to cause no coagulation of particles. Then, after adding an appropriate amount of curing agent, they were spread over a glass plate.

A spacer made of aluminum foil was provisionally secured to the peripheral side of a light reflection plate prepared by vapor-depositing aluminum on one surface of a transparent acrylic resin plate of 100 mm×100 mm×5 mm thickness having both surfaces flat ("Acrymirror", registered trade mark, manufactured by Acrymirror Co.) The spacer was placed on the surface having no aluminum layer. Then, the plate was placed on the glass plate such that the surface of the light reflection plate opposite to the aluminum deposited surface was in contact with the Acribond containing titanium oxide with no inclusion of air bubbles. Polymerization was conducted for about 2 hours at room temperature with a small weight and, thereafter, the light reflection plate was separated from the glass plate. The thickness of the spacer was set at four levels, that is, (1) 1.0 mm (2) 0.5 mm (3) 0.1 mm and (4) 0.05 mm corresponding respectively to the four types described above. In this way, 16 types of sample plates were prepared.

These plates were respectively cut to a size of 65 mm×65 mm, in which an area of 60 mm×50 mm was assumed as an effective light diffusing and irradiating face and the angle of inclination at each of the edge faces other than the light incident face was defined as described below.

Specifically, referring to FIG. 3, the following dimensions were used: $T=5$ mm, $a=55$ mm, $X-(1.2)a=27.5$ mm.

Since
$X=T(1+\tan^2\theta)2\tan\theta$,
$27.5=5(1+\tan\theta)2\tan\theta$,
$\tan\theta=5.5+5.408$
$\theta=5.26°$ or $84.8°$
as $\theta \leqq 45°$, $\theta=5.26°$ Since X is about 24 mm at $\theta=5°$ and about 29 mm at $\theta=6°$, $\theta$ is set to 6°. Each of three edge faces of the plates was cut with $\theta=6°$ and subjected to flame polishing. Then, the aluminum deposited side of a recurring reflection sheet with a transparent adhesive (Sparklight "registered trade mark", manufactured by Unichika Co.) was applied to each of three inclined edge faces. A black paint was further coated thereover and dried.

In the light diffusing device obtained in this way, the thickness of the diffusing layer was prepared to be substantially the same as that for the spacer and the thickness of the intermediate layer was about 0.05 mm.

The light diffusing devices prepared as described above were arranged in a row and an elongated light source was disposed on the light incident edge faces thereof. The light diffusing and irradiating faces were observed with a naked eye simultaneously, whereby light diffusion and irradiation with preferred uniformity was recognized for each of the devices. Particularly, those devices to which amounts of titanium oxide of between 0.3–0.1% had been added and with a thickness of the light diffusing layer of between 0.5–0.05 mm provided excellent brightness.

EXAMPLE 2

Rutile type titanium oxide was dry blended in 1.5% by weight with acrylic resin pellets prepared according to experiment No. 1 of Example 1 of U.S. patent application Ser. No. 526,546 filed on Aug. 26, 1983 (E.P. Application No. 82300835.4) and formed using a conventional extruder into a film of 50 μm thickness. The film was extended over an inorganic flat glass plate so as not to incorporate air bubbles and provisionarily secured by means of methyl methacrylate. Then, two sheets of such glass plates were placed opposite to each other by way of a spacer to form a cell in the conventional method, and syrup of methyl methacrylate was poured in the conventional manner therebetween which was then polymerized under a clamping action.

The base plate thus obtained was cut into a 65 mm×65 mm size, and each of the three end faces thereof was cut at an angle of $\theta=6°$ and each of the edge faces was flame polished in the same manner as in Example 1. Then, the aluminum deposited surface of a recurring reflection sheet with a transparent adhesive (Sparklight "trade mark", manufactured by Unichika Co) was closely contacted to the each of three inclined edge faces, and black paint was coated and dried further thereover. The light diffusing layer thus obtained had a thickness of about 0.05 mm and the intermediate layer had a thickness of about 0.1 mm.

The Acrimirror as described above was used as the light reflection plate and arranged at the rear face of the base plate.

A light source was disposed adjacent to the light incident edge face of the light diffusing device prepared as described above and the diffusing and irradiating face was observed with naked eyes to recognize light diffusion and irradiation with satisfactory uniformity.

In the light diffusing device according to this invention as described above, since the light incident from the light incident edge face to the inside of the base plate 2 is reflected, by way of the light reflection surface 5 or the reflection plate 5' and the light scattering and reflection face 6 in the inside of the base plate 2, and, thereafter, irradiated from the light diffusing and irradiation face at the surface with a sufficient uniformity, a light diffusing device particularly suitable to a reduced-size case can be obtained, which has low optical loss with respect to the light from the light source, has a light diffusing and irradiating face of extremely preferred uniformity and can be manufactured by a simple and convenient process.

EXAMPLE 3

The following samples (1)–(6) were prepared.

(1) Sample 1

Acrylic resin pellet used in Example 2 was dry-blended with 1.5% by weight of rutile type titanium oxide and molded into a film of 50μ thickness in a conventional extruder. The film was extended on an inorganic flat glass plate so as not to include air bubbles and, after being provisionally secured with methylmethacrylate, a cell was formed with glass plates by means of a spacer in a conventional manner. Methylmethacrylate syrup was poured in the clearance of the cell and polymerized to cure by a conventional manner to obtain an acrylic resin plate of 5 mm thickness. The intermediate layer had a thickness of about 0.05 mm.

The acrylic resin plate was masked on the white colored side in a conventional manner, mounted to a vacuum deposition device and vapor-deposited with aluminum on the transparent side thereof to a thickness of more than about 500 Å. The plate was cut into a size of 60 mm square and one end side thereof was subjected to flame polishing while other remaining three sides were respectively cut into end faces each with an angle of 6° as in Example 2. A light reflection sheet with transparent adhesives was closely bonded at the aluminum deposited thereof for each of the three inclined end faces to prepare a sample 1.

(2) Sample 2

An acrylic adhesive ("Acrybond") was incorporated with 0.3% by weight of rutile type titanium oxide, sufficiently mixed and prepared into an acrylic resin plate of the total thickness of 5 mm with the spacer thickness of 0.5 mm in the same manner as in Example 1. The intermediate layer had a thickness of about 0.08 mm. The plate was fabricated into the same size as in Example 3 (1) (60 mm square) and subjected to end face fabrication to prepare a sample 2.

(3) Sample 3

An acrylic resin plate was prepared in the same procedures as in Example 3 (1) into a sample of 60 mm square, in which no inclined faces were formed but all of the four sides were cut vertically to the upper and lower faces. Then a light reflection sheet was applied on each of three sides to prepare a sample 3.

(4) Sample 4 (Comparative sample)

An "Acrymirror" plate of 5 mm thickness used in Example 1 was cut into the size of 60 mm square and four sides thereof were fabricated quite in the same as in Example 3 (1). Then the acrylic film of 50μ thickness as used in Example 3 (1) was melt-bonded under pressure on the surface opposite to the aluminum vapor-deposited face by using a heat roll to prepare a sample 4.

(5) Sample 5 (Comparative sample)

An "Acrymirror" plate of 5 mm thickness was cut into the same configuratio as that in Example 3 (1) and the cut end faces were fabricated quite in the same manner as in Example 3 (1). Then polyurethane type white paint ("Vtop", manufactured by Dai Nippon Toryo K.K.) was uniformly coated twice on the surface opposite to the aluminum vapor-deposited face by using a spray gun and dried to prepare a sample 5.

(6) Sample 6 (Comparative sample)

An "Acrymirror" plate of 5 mm thickness was cut into the same configuration as that in Example 3 (1) and the cut end faces were fabricated quite in the same manner as in Example 3 (1). The following liquid dispersion was prepared and roll-coated on the surface of the fabricated plate to a film thickness of 50μ. The liquid dispersion was prepared by dispersing, into an acetone solution containing 10% by weight of polymethyl methacrylated an organic light diffusing agent (glass modifier KF-710, manufactured by Rohm and Haas Co., U.S.A.) by the amount of 15% based on the polymer and, further, adding rutile type titanium oxide by 1% by weight based on the polymer. The sample was used as the sample 6.

For each of the six samples as described above, light was introduced from one end face thereof using the same light source and the luminosity at the center of the surface irradiated with diffusing light was measured by using a luminous meter.

Light source Fluorescent lamp 8 mm diameter × 90 mm length, electrical power input 1.5 W
Luminous meter: Minolta Luminous meter
View angle 1°
Dark room: measured at room temperature of 26° C.
Result of Measurement (unit: $Cd/m^2$)
Luminance: Judgment with naked eyes of the value light uniformity at the surface irradiated with diffusing light

| Sample 1 | 526.2 | excellent |
| Sample 2 | 498.3 | excellent |
| Sample 3 | 490.5 | good |
| Sample 4 | 386.7 | fair |
| Sample 5 | 403.8 | fair |
| Sample 6 | 250.4 | poor |

EXAMPLE 4

An acrylic resin pellet prepared according to Experiment No. 2 of Example 1 of U.S. patent application Ser. No. 526,546 filed on Aug. 26, 1983 (E.P. Application No. 82300835.4) was dry blended with 0.3% by weight of rutile type titanium oxide and 0.01% by weight of Diaresinret S (Dye for synthetic resin, manufactured by Mitsubishi Chemical Industries Ltd.) and molded into a film of 50μ thickness by using a conventional extruder. Then, a sample of 60 mm square was prepared in the same manner as in Example 3 (1). The thickness of the diffusion layer of the substrate thus obtained was about 100μ although it was difficult to distinguish it from that of the intermediate layer, and it was twice as thick as the 50μ thickness of the film used. When the light form the white fluorescent lamp as used for the evaluation in Example 3 to the sample, red diffusing irradiation light having the same spectral property as that of the dye was obtained and the optical diffusing property was satisfactory.

Obviously, numerous modifications and variations of the present invention are possible in light of the above teachings. It is therefore to be understood that within the scope of the appended claims, the invention may be practiced otherwise than as specifically described.

What is claimed as new and desired to be secured by Letters Patent of the United States is:

1. A process for producing a light diffusing device comprising;
   forming a transparent light transmitting base plate wherein at least one edge face of said base plate is a light incident face;
   forming a light diffusing layer on at least a first surface of said base plate;
   forming a light reflection surface in the vicinity of a second surface of said base plate; and forming an intermediate layer between said base plate and said light diffusing layer to integrally bond together said base plate and said light diffusing layer, said intermediate layer being formed through partial dissolution with methyl methacrylate monomer or a partial polymer thereof of said first surface of said base plate or said diffusing layer.

2. The process of claim 1, wherein said intermediate layer is formed through partial dissolution of said first surface of said base plate with methyl methacrylate monomer or a partial polymer thereof containing a light diffusing agent from which said light diffusing layer is formed.

3. The process of claim 1, wherein said base plate is made from polymethyl methacrylate.

4. The process of claim 1, wherein said intermediate layer is formed through partial dissolution of a surface of said light diffusing layer with methyl methacrylate monomer or a partial polymer thereof.

* * * * *

UNITED STATES PATENT AND TRADEMARK OFFICE
CERTIFICATE OF CORRECTION

PATENT NO. : 4,775,222

DATED : Oct. 4, 1988

INVENTOR(S) : Makoto OHE

It is certified that error appears in the above-identified patent and that said Letters Patent is hereby corrected as shown below:

On the Title Page:

Please add the following Priority information:

-- Foreign Application Priority Data
Aug. 27, 1984 [JP] Japan ............... 59-176758 --

Signed and Sealed this

Fourth Day of July, 1989

*Attest:*

DONALD J. QUIGG

*Attesting Officer*  *Commissioner of Patents and Trademarks*